US012610933B2

(12) United States Patent
Haehnel

(10) Patent No.: US 12,610,933 B2
(45) Date of Patent: Apr. 28, 2026

(54) DEADSTIK FISHING HOLE DEVICE

(71) Applicant: Brian Jon Haehnel, Inver Grove Heights, MN (US)

(72) Inventor: Brian Jon Haehnel, Inver Grove Heights, MN (US)

( * ) Notice: Subject to any disclaimer, the term of this patent is extended or adjusted under 35 U.S.C. 154(b) by 0 days.

(21) Appl. No.: 18/482,012

(22) Filed: Oct. 5, 2023

(65) Prior Publication Data

US 2025/0113811 A1 Apr. 10, 2025

(51) Int. Cl.
*A01K 97/01* (2006.01)

(52) U.S. Cl.
CPC ..................................... *A01K 97/01* (2013.01)

(58) Field of Classification Search
CPC ....................................... A01K 97/01
USPC ....................................... 43/4–57.3
See application file for complete search history.

(56) References Cited

U.S. PATENT DOCUMENTS

| | | | | |
|---|---|---|---|---|
| 4,253,262 A | * | 3/1981 | Johnson ................. | A01K 97/01 |
| | | | | 43/17 |
| 5,564,213 A | * | 10/1996 | Rinehart ................ | A01K 97/01 |
| | | | | 43/17 |
| 6,898,891 B1 | * | 5/2005 | Needham ............... | A01K 97/01 |
| | | | | 5/6 |
| 2004/0237374 A1 | * | 12/2004 | Klein ..................... | A01K 97/01 |
| | | | | 43/21.2 |
| 2015/0208633 A1 | * | 7/2015 | Schramski ........... | A01K 97/125 |
| | | | | 43/4.5 |

* cited by examiner

*Primary Examiner* — Christopher D Hutchens
*Assistant Examiner* — Steven J Shur

(57) ABSTRACT

A deadstik fishing hole device for use primarily for ice fishing. The deadstik fishing hole device is designed to fit a variety of different size holes and sleeves in wheelhouses, ice houses, and similar ice fishing dwellings. The device also contains a gaff to help bring fish out of the hole. The deadstik fishing hole device generally includes a plastic base, paddles, and airlock plate along with stainless steel compression springs, gaff, roll pin, and nut.

7 Claims, 9 Drawing Sheets

20 (Paddle)

30 (Compression Spring)

40 (Gaff)

10 (Base)

60 (Nut)

30 (Compression Spring)

20 (Paddle)

DEADSTIK 50 (Roll Pin)

20 (Paddle)

30 (Compression Spring)

10 (Base)

50 (Roll Pin)

30 (Compression Spring)

20 (Paddle)

40 (Gaff)

20 (Paddle)

60 (Nut)

10 (Base)

50 (Roll Pin)

30 (Compression Spring)

30 (Compression Spring)

20 (Paddle)

70 (Airlock Plate)

DEADSTIK FISHING HOLE DEVICE

BACKGROUND

Example embodiments in general relate to deadstik hole centering device with gaff devices and more specifically it relates to a deadstik fishing hole device for use primarily for ice fishing. The deadstik fishing hole device is designed to fit a variety of different size holes and sleeves in wheelhouses, ice houses, and similar ice fishing dwellings. The device also contains a gaff to help bring fish out of the hole.

SUMMARY

An example embodiment of the present invention is directed to a deadstik hole centering with gaff device which includes a base, paddles, and airlock plate along with stainless steel compression springs, gaff, roll pin, and nut.

There has thus been outlined, rather broadly, some of the features of the deadstik fishing hole device in order that the detailed description thereof may be better understood, and in order that the present contribution to the art may be better appreciated. There are additional features of the deadstik fishing hole device that will be described hereinafter and that will form the subject matter of the claims appended hereto. In this respect, before explaining at least one embodiment of the deadstik fishing hole device in detail, it is to be understood that the deadstik fishing hole device is not limited in its application to the details of construction or to the arrangements of the components set forth in the following description or illustrated in the drawings. The deadstik fishing hole device is capable of other embodiments and of being practiced and carried out in various ways. Also, it is to be understood that the phraseology and terminology employed herein are for the purpose of the description and should not be regarded as limiting.

One object is to provide a deadstik fishing hole device for use primarily for ice fishing. The deadstik fishing hole device is designed to fit a variety of different size holes and sleeves in wheelhouses, ice houses, and similar ice fishing dwellings. The device also contains a gaff to help bring fish out of the hole.

Another object is to provide a Deadstik Fishing Hole Device that centers the fishing line in the center of the hole so the line does not freeze in.

Another object is to provide a Deadstik Fishing Hole Device that has a handy gaff which is quickly accessible by means of extending it from the recessed track in the base unit of the device.

Another object is to provide a Deadstik Fishing Hole Device that installs and removes easily in any size hole to quickly harvest your catch.

Another object is to provide a Deadstik Fishing Hole Device that floats.

Other objects and advantages of the various embodiments of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
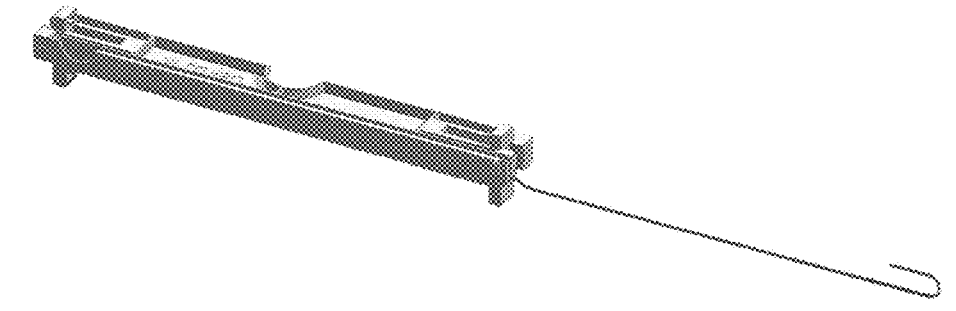
FIG. 1 is an upper perspective view of the present invention. 3D Gaff Side with Gaff Open.

Turning now descriptively to the drawings, in which similar reference characters denote similar elements throughout the several views, the figures illustrate an example embodiment comprising a plastic base, paddles, and airlock plate along with stainless steel compression springs, gaff, roll pin, and nut.

B. Base

The base of the device is the first main element that all other elements are attached or affixed to. The base is to be made of a hardened material; most likely plastic. The base contains holes and slots where each of the other main elements are attached or affixed. The device is also designed with air pockets for buoyancy, a thumb notch to access the gaff, and an opening in the recessed gaff track to enable air flow and drainage to reduce water retention where the gaff sits when closed.

The deadstik fishing hole device uses a hardened material to be formed by injection mold, 3D printer, or other means available to form 10 (Base), 20 (Paddles), 70 (Airlock Plate). Once the material is formed and hardened all other elements are to be attached or affixed. This is best illustrated in FIGS. 1, 2, 3, and 4. As illustrated, the 10 (Base) includes slots for 30 (Compression Springs) and 20 (Paddles) along with two predrilled holes for the insertion of 40 (Gaff) and 60 (Nut) on one end and two predrilled holes for the insertion of 50 (Roll Pin) on the other end which will then hold a 30 (Compression Spring) and a 20 (Paddle) in place on each end once attached. There is also a long recessed track to hold 40 (Gaff) in a closed position along with a thumb notch for 40 (Gaff) access, as best illustrated in FIG. 3. On the bottom of 10 (Base) is a void to which the 70 (Airlock Plate) will be affixed to enable buoyancy as illustrated in FIG. 4. The assembly of the device will be described in the final description.

The main function of the deadstik fishing hole device is to keep the fishing line centered in the ice hole by using the half circle, which is designed in the middle of the 10 (Base) as seen in FIGS. 1, 2, 3, and 4. It could also be used to center other fishing equipment such as fish locators or cameras to help prevent expensive gear from being frozen to the side of the ice hole. Once assembled, to use the device place one 20 (Paddle) against the side of an ice hole container and push to compress 30 (Compression Spring) until you can place the other 20 (Paddle) onto the opposite side of the ice hole container. To remove, lift straight up. Then, if needed, deploy the 40 (Gaff) using the thumb notch on the side of the 10 (Base) for harvesting catch.

Variations of the 10 (Base) in FIGS. 1, 2, 3, and 4 may include the use of different types of materials. Other than plastic, use of materials such as wood, metal, or the like could be made. The configuration may vary with use of a different material. The 10 (Base) could be used as shown but could also feature additions or deletions of any other base element. Other components could be incorporated into 10 (Base) such as lights, knives, electronic equipment, etc.

C. Paddles

The second main element are paddles which slide through a slot on each end of the base. The paddles will be held in place by the gaff and nut on one end and a roll pin on the other end. The paddles main function on each end is to retain the compression springs which will be used to expand or compress to fit different size holes. The paddles are to be made of the same material as the base so as not to cause too much friction.

The second main element of the deadstik fishing hole device can be seen illustrated in FIGS. 1, 2, 3, and 4. The principles and concept of the element are best illustrated by reference number 20 (Paddle). The 20 (Paddle) is typically made of the same material as the 10 (Base) but not limited to that material as noted in the 10 (Base) detailed description. The 20 (Paddle) is to be installed after 30 (Compression Spring) in the slot provided in the 10 (Base) followed by a fastening device such as the 40 (Gaff) and 60 (Nut) or the 50 (Roll Pin). The 20 (Paddle) is solid on the outside edge where retained as shown in FIG. 1. The 20 (Paddles) have a circular slot on one side which helps retain 30 (Compression Spring) and said slot can be seen in FIGS. 2, 3, and 4 as they face the 10 (Base). The 20 (Paddle) is designed with a bottom side that is bit longer than the top side. The bottom side is used to retain the device onto a variety of different size containers. The top side of the 20 (Paddle) is typically used as a finger hold to compress the 30 (Compression Spring) to seat the device onto a container or sleeve.

Variations of the 20 (Paddles) as seen in FIGS. 1, 2, 3, and 4 may include the use of different types of material. Other than plastic, use of materials such as wood, metal, or the like could be made. The configuration may vary with use of a different material and could have many sizes.

D. Compression Springs

The third main element are compression springs. Their main function is to expand or contract in the base using the paddles. The compression springs can vary in size and strength. The spring is to be made of metal; most likely stainless steel.

Figure 2:
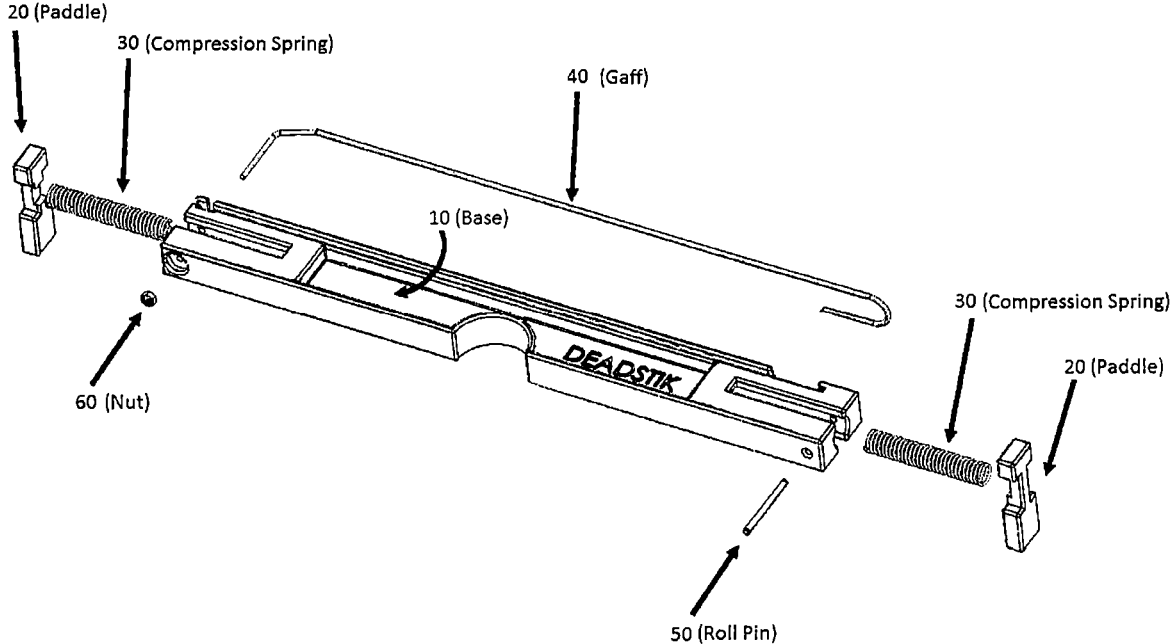
FIG. 2 is an exploded upper perspective view of the present invention. 3D Nut Bolt Side.
Figure 3:
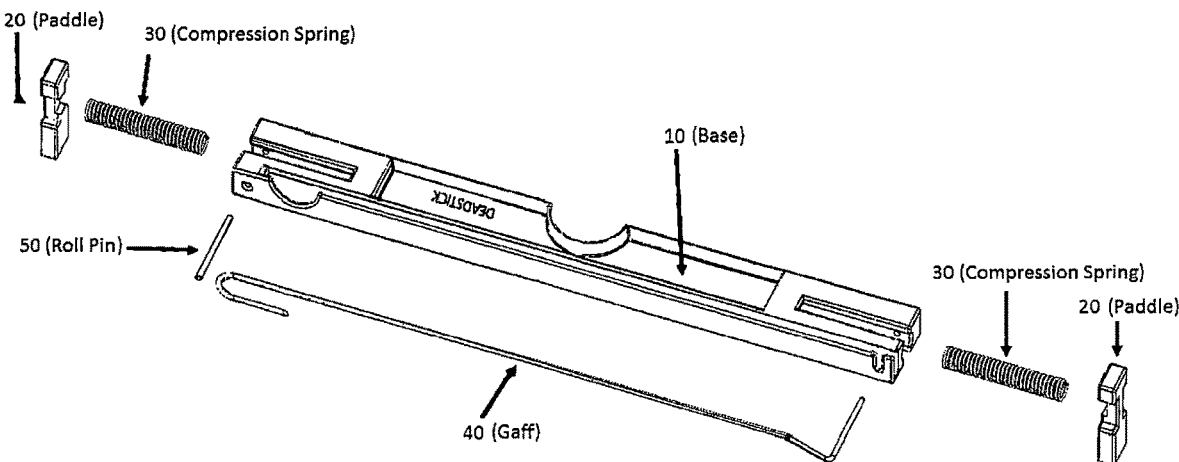
FIG. 3 is an exploded upper perspective view of the present invention. 3D Gaff Hook Side.
Figure 4:
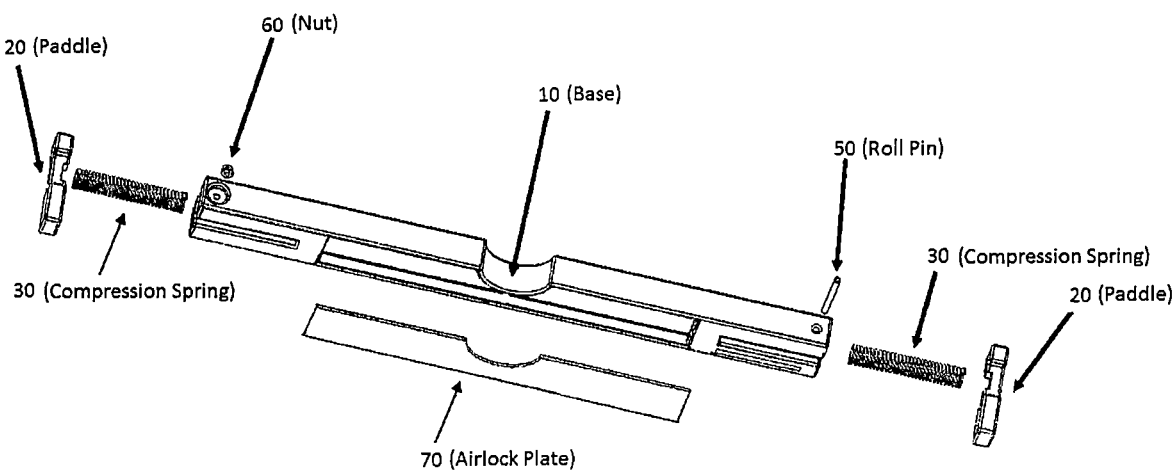
FIG. 4 is an exploded lower perspective view of the present invention. 3D Exploded Lower Perspective View.
Figure 5:
FIG. 5 is an alternative embodiment of the present invention. Assembled prototype in use.
Figure 6:
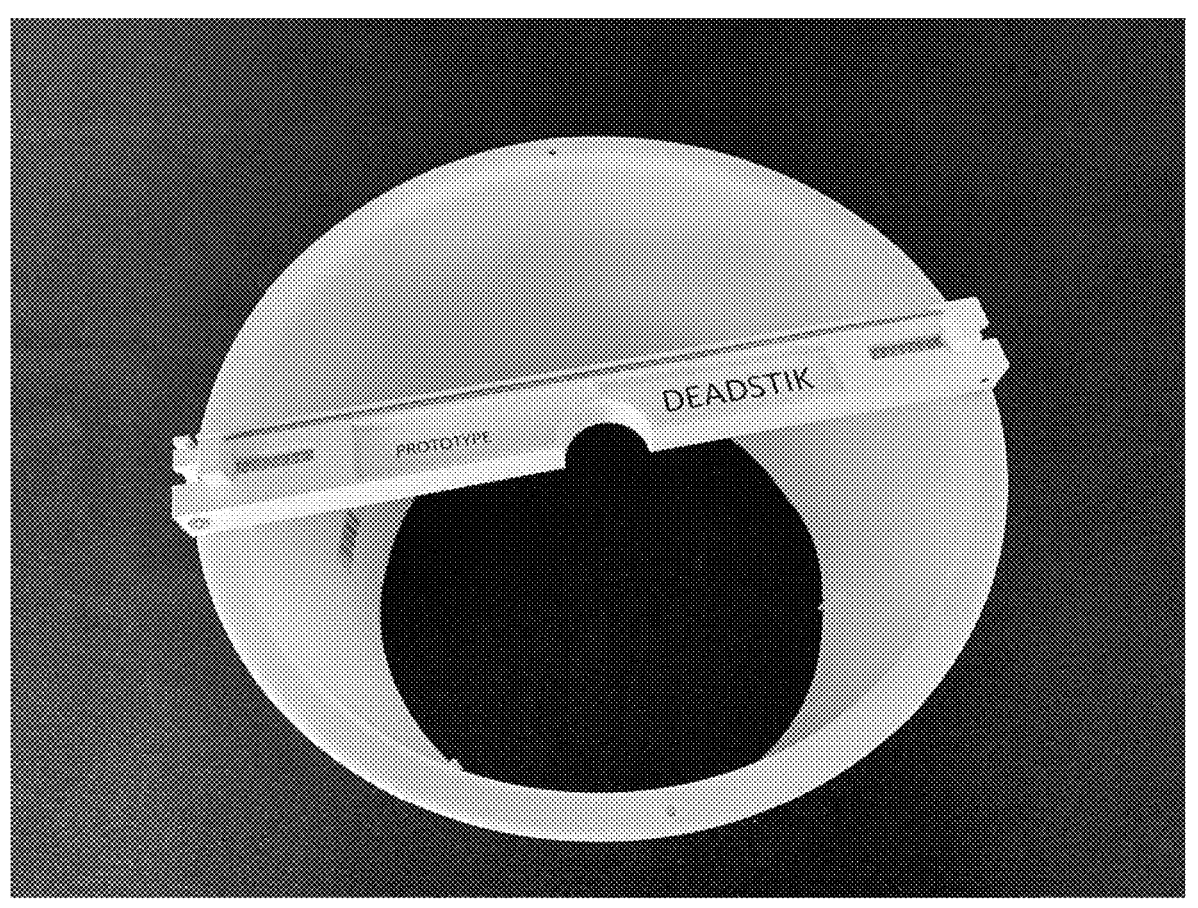
FIG. 6 is a first alternative embodiment of the present invention. Assembled prototype close up in use position.
Figure 7:
FIG. 7 is a second alternative embodiment of the present invention. Assembled prototype showing recessed compression spring opening and paddle slot.
Figure 8:
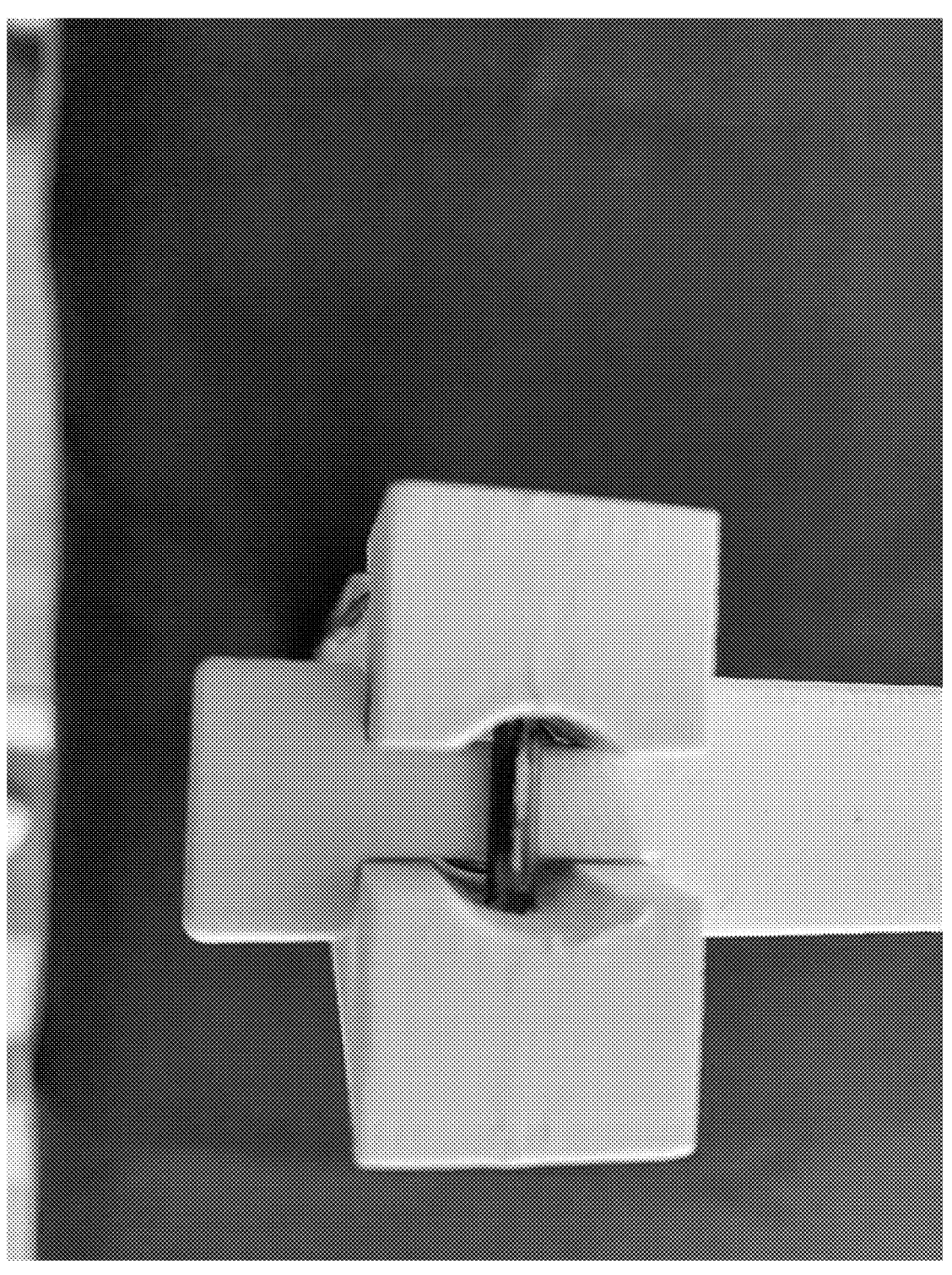
FIG. 8 is a third alternative embodiment of the present invention. Assembled prototype end view of paddle showing with roll pin.
Figure 9:
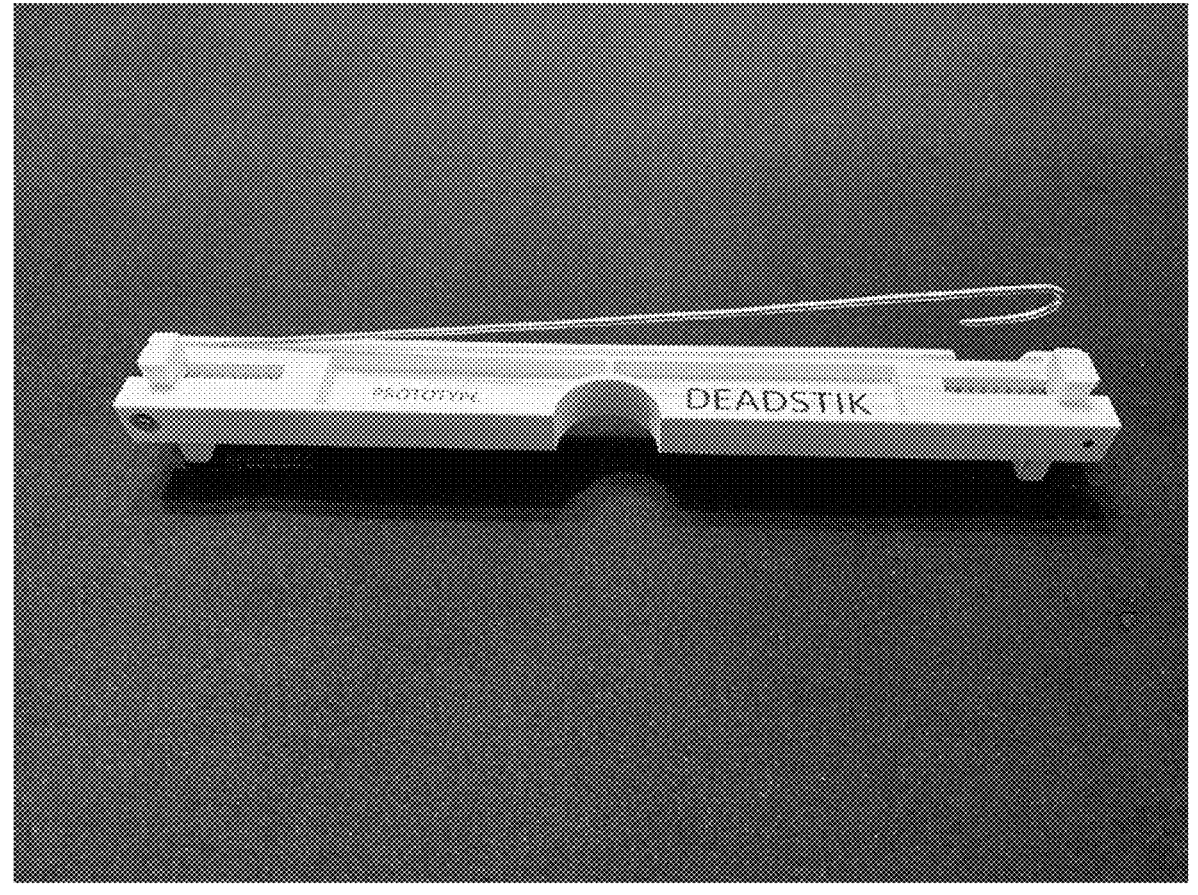
FIG. 9 is a fourth alternative embodiment of the present invention. Assembled prototype front view.

The third main element of the deadstik fishing hole device is a 30 (Compression Spring) which is best illustrated in FIGS. 2, 3, and 4. The 30 (Compression Spring) is used to compress and expand by use of the 20 (Paddles) which are held in place by use of a fastening element such as the 40

(Gaff) and 60 (Nut) or the 50 (Roll Pin) as shown in FIGS. 1, 2, 3, and 4, when attached to the 10 (Base). The 30 (Compression Spring) would typically be made of a corrosion-resistant material to prevent rusting due to moisture, water, and temperature changes.

Variations of the 30 (Compression Spring) in FIGS. 2, 3, and 4 may include the overall dimensions of the 30 (Compression Spring) and could also include a change as to wire size, length, material, and/or diameter. The other materials that could be used consist of stainless steel, steel, plastic, or any other flexible material but all care should be taken to use a corrosion-resistant material.

E. Gaff

The fourth main element is a gaff. The main function for use is to gaff a fish to extract it from the water. This gaff is attached and housed in a recessed track in the base. The gaff is designed to be released by inserting your thumb into the thumb notch and pushing or pulling the gaff out of the recessed track in the base element. The gaff is used with a nut and acts as a retaining device on one end of the base to hold a paddle and a compression spring in place. The gaff is designed to stay open when in use and to remain in the base recessed track when shut. The gaff is to be made of metal; most likely stainless steel.

The fourth main element of the deadstik fishing hole device is a 40 (Gaff) which is best illustrated in FIGS. 1, 2, and 3. The primary use of 40 (Gaff) is as a gaff hook to gaff and land fish. The secondary use of 40 (Gaff) is as a fastening element to be attached to 10 (Base) with 60 (Nut) and retains 30 (Compression Spring) and 20 (Paddle) on one end of the 10 (Base). The 40 (Gaff) is typically made of stainless steel but is not limited to that material. When in use the 40 (Gaff) is out and 40 (Gaff) is closed when folded and recessed into the gaff track on the 10 (Base) to prevent injury due to the sharpness of the gaff hook. There is a thumb notch in 10 (Base) to allow you to release the 40 (Gaff) from is recessed position which is best seen in FIG. 3. Basically the 40 (Gaff) is to be used in open or closed position for proper use and function.

Variations of the 40 (Gaff) in FIGS. 1, 2, and 3 could include the length or width. Other materials that could be used consist of stainless steel, galvanized steel, plastic, or any other material which is found to be a corrosion-resistant material. The hook on the 40 (Gaff) could contain many variations.

F. Roll Pin

The fifth main element is a roll pin. The main function is to retain a paddle and compression spring on one end of the base, opposite the gaff and nut end. The roll pin is an existing product made to expand when inserted into a hole. However, the pin can be a simple piece of metal that is wider in diameter than the base hole for a tight fit. The pin may be made of many different types of materials including plastic, metal, wood, or any material that would have strength for this purpose; most likely stainless steel.

The fifth main element of the deadstik fishing hole device is a 50 (Roll Pin) as seen in FIGS. 2, 3, and 4. The 50 (Roll Pin) is used on one end of the 10 (Base) to hold a 30 (Compression Spring) and a 20 (Paddle) in place on the 10 (Base). This element is primarily made of a stainless steel material but is not limited to that material.

Variations of the 50 (Roll Pin) in FIGS. 2, 3, and 4 could include the length or width. Other materials that could be used consist of stainless steel, wood, plastic, or any other material which is found to be a corrosion-resistant material.

G. Nut

The sixth main element is a simple nut used to hold the gaff in place after being inserted into the base. The nut is an existing product. The nut can be made of many different types of materials and may be a threaded cap, or aviation nut; most likely threaded stainless steel. The retaining device is not limited to a nut but can have any type of method used to hold the Gaff in place.

The sixth main element of the deadstik fishing hole device is a 60 (Nut) as best seen in FIGS. 2 and 4. The 60 (Nut) is primarily used to hold the 40 (Gaff) in place which in turn holds the 30 (Compression Spring) and 20 (Paddle) onto the 10 (Base) but it should also allow the 40 (Gaff) to move in and out of the recessed track on 10 (Base). The 60 (Nut) is primarily made of a stainless steel material but is not limited to that. The 60 (Nut) may be a threaded nut, cap nut, compression nut, or any other variety.

Variations of the 60 (Nut) in FIGS. 2 and 4 could include a threaded nut, cap nut, compression nut or any element similar to the stainless steel 60 (Nut) shown to retain the 40 (Gaff). Other materials that could be used should be found to be a corrosion-resistant material.

H. Airlock Plate

The seventh main element is an airlock plate that is installed on the bottom side of the base unit to give the unit buoyancy.

The seventh main element of the deadstik fishing hole device is the 70 (Airlock Plate) as seen in FIG. 4. Also, as illustrated in FIG. 4 the 10 (Base) has a void to which the 70 (Airlock Plate) is to be affixed to enable buoyancy. The 70 (Airlock Plate) is typically made of a thin piece of plastic and fastened or glued into place on 10 (Base) bottom.

Variations of the 70 (Airlock Plate) as seen in FIG. 4 may include the use of different types of lightweight material. Other than plastic, use of materials such as wood, tape, or the like could be made. The configuration may vary with use of a different material, however, care should be taken not to add additional weight to the deadstik fishing hole device.

I. Connections of Main Elements and Sub-Elements of Invention

The deadstik fishing hole device 10 (Base), 20 (Paddles), and 70 (Airlock Plate) are made of a hardened material. The 30 (Compression Spring), 40 (Gaff), 50 (Roll Pin), and 60 (Nut) are stainless steel. Beginning with 10 (Base) with thumb notch facing you as shown in FIG. 3 insert the 30 (Compression Spring) into the right hand opening followed by the 20 (Paddle) then insert 40 (Gaff) and secure with 60 (Nut) finish by closing 40 (Gaff) into the recessed gaff track. Next insert a 30 (Compression Spring) and 20 (Paddle) into the opposite end of the 10 (Base) and secure with 50 (Roll Pin). Of note is that the 40 (Gaff) is out when in use and recessed flush when closed. The 30 (Compression Spring) insertion point on both ends are rounded recessed slots in the 10 (Base) as seen on FIGS. 2 and 3. The 20 (Paddle) is placed through that same slot immediately after the 30 (Compression Spring).

J. Alternative Embodiments of Invention

Alternate variations could be made by enlarging or downsizing the base, springs, paddles, gaff hook, and retainer pin.

This device could use different types of plastics or any other hardened material. The 10 (Base) could have additional parts added such as LED lights, knives, reels, line alarms, etc.

K. Operation of Preferred Embodiment

The user places the deadstik fishing hole device onto a container, sleeve, or solid object to keep the fishing line centered in the ice hole. The user holds the base 10 and places it in the fish hole. The process used to do this is to compress one paddle 20 onto the side of a container, sleeve, or solid object to center the deadstik fishing hole device. The compression of the paddle 20 is accomplished by the compression spring 30 which allows easy movement installing and removing the deadstik fishing hole device. The release of the gaff 40 is done by pushing up at the thumb notch on the side of the base 10. The airlock plate 70 serves to create a void in the base 10 in order to keep the deadstik fishing hole device buoyant if dropped into the water or other liquids.

Assembly instructions consist of the following steps. Begin with base 10. First, with the DEADSTIK insignia and center half circle facing you, install a compression spring 30 and a paddle 20 on the right hand end. The compression spring 30 will fit into a round recessed chamber at the base of the slot then the paddle 20 is to be installed with the flat side out and the round slot facing the compression spring 30 to hold the compression spring 30 securely in place, making sure that the longer side of the paddle 20 is installed toward the bottom of the base 10. Once both the compression spring 30 and the paddle 20 (flat side out and long side down) are in place, install the roll pin 50 into the two predrilled holes on the end and push or hammer roll pin 50 in for a snug fit. Next, with the DEADSTIK insignia and center half circle facing you, install a compression spring 30 and a paddle 20 on the left hand end. The compression spring 30 will fit into a round recessed chamber at the base of the slot then the paddle 20 is to be installed with the flat side out and the round slot facing the compression spring 30 to hold the compression spring 30 securely in place, making sure that the longer side of the paddle 20 is installed toward the bottom of the base 10. Once both the compression spring 30 and the paddle 20 (flat side out and long side down) are in place, install the gaff 40 into the two predrilled holes on the end and secure by placing 60 nut and tighten until top of nut 60 is flush with base 10. Fold gaff 40 into the recessed gaff hook track to close. The recessed gaff hook track is built into the design of the base 10 and will fit tightly when recessed and not in use. The gaff 40 is the second main function of this device. The gaff 40 is used to assist in landing fish through the ice hole. The gaff 40 is made to swivel 180 degrees. The release of the gaff 40 is done by pushing up at the thumb notch on the side of the base 10. The gaff 40 has a rounded hook on one end and is tapered to be sharp. The user is able to use either function separately. Finally, install the airlock plate 70 over the void on the bottom of base 10 to enable buoyancy.

Unless otherwise defined, all technical and scientific terms used herein have the same meaning as commonly understood by one of ordinary skill in the art to which this invention belongs. Although methods and materials similar to or equivalent to those described herein can be used in the practice or testing of the deadstik fishing hole device, suitable methods and materials are described above. All publications, patent applications, patents, and other references mentioned herein are incorporated by reference in their entirety to the extent allowed by applicable law and regulations. The deadstik fishing hole device may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. An ice fishing device comprising:

a base, the base being a primary component, the base being composed of a rigid lightweight floatable material, and the base is configured to be affixed horizontally in an aperture in ice;

the base is rectangular in shape, with a semi-circle notch located at a midpoint of, or equidistant from, two opposite ends of the base; the semi-circle notch is configured to center one of a line, a wire, a rope, a string, a cable, a filament, a thread, a twine, or a cord to prevent a fishing ligature from migrating to an edge of the aperture and freezing to the ice;

the base further comprising on a side of the base opposite the semi-circle notch, a long narrow slot running a length of the base to house a gaff with a cutout thumb notch configured to allow access to and release the gaff;

each of the ends of the device base contains a channel with small holes drilled perpendicular to the channel, which are configured to be used for assembly of compression springs, paddles, a roll pin, the gaff and a nylon nut.

2. The ice fishing device as set forth in claim 1, wherein the paddles are I-shaped components composed of a rigid lightweight floatable material and are configured to be installed into each of the ends of the base in the channels and configured to engage the compression springs; the paddles use tension to hold the base to the aperture in the ice.

3. The ice fishing device as set forth in claim 1, wherein the compression springs are helical springs composed of a non-corrosive material and are configured to be installed into each of the end of the base in the channels and to engage the I-shaped paddles to maintain force between surfaces of the aperture; the configuration of the compression springs and the paddles allows the ice fishing device to compress and expand to accommodate different size apertures.

4. The ice fishing device as set forth in claim 1, wherein the gaff is a rigid wire composed of a non-corrosive material, the gaff comprising a hook on one end of the gaff and a threaded portion on an opposite end, the opposite end with the threaded portion being bent at a 90-degree angle such that the threaded portion can slide into a hole on one of the ends of the base, the gaff affixed to the base with the nylon nut; the threaded portion of the gaff attached in a manner which acts as a stop for one of the compression springs and one of the paddles on one of the ends of the base; the gaff when not in use is configured to close into the narrow slot on the long side of the base opposite the semi-circle notch; the gaff is accessible with the cutout thumb notch configured to allow access to and release the gaff.

5. The ice fishing device as set forth in claim 4, wherein the roll pin is a cylindrical 1" piece of rigid tubing composed of a non-corrosive material, the roll pin is installed in the hole on the end of the base opposite the nylon nut and the threaded portion of the gaff, the roll pin acts as a second stop to hold one of the compression springs and one of the paddles in place the end of the base opposite the nylon nut and the threaded portion of the gaff.

6. The ice fishing device as set forth in claim 4, wherein the nylon nut is a non-corrosive nylon insert nut; the nylon nut is a locknut with a nylon collar that increases friction on a screw thread; the nylon of the nylon nut is configured to greatly increase friction between the nylon nut and the gaff, such that the nylon nut is resistant to coming off during operation; the threaded portion configured to cut threads into the nylon nut when the nylon nut is rotated onto the threaded portion of the gaff; and the nylon nut and threaded portion is configured to hold the gaff in place on the base.

7. The ice fishing device as set forth in claim 1, further comprising an airlock plate configured to increase buoyancy by trapping air within a sealed compartment inside the base, and the airlock plate provides flotation, by creating a sealed chamber within the ice fishing device with the trapped air, the airlock plate and the sealed compartment providing buoyancy and significantly reducing the overall weight of the device, allowing the device to float in water.

* * * * *